Patented Sept. 5, 1933

1,925,326

UNITED STATES PATENT OFFICE 1,925,326

THEOBROMINE EXTRACTING PROCESS

John Harvey Kellogg, Battle Creek, Mich., and George L. Teller and William Kedzie Teller, Riverside, Ill., assignors to The Battle Creek Food Company, Battle Creek, Mich., a corporation of Michigan No Drawing. Application November 13, 1929
Serial No. 406,984

11 Claims. (Cl. 99—11)

Our invention relates to the preparation of food products from the cacao bean such as chocolate and cocoa and deals more particularly with the removal of alkaloids from all types of cacao products.

Various attempts have been made to remove the alkaloids, the principal of which is theobromine, from cacao products and particularly from the powder employed in the preparation of commercial cocoa. These methods have not, however, been entirely satisfactory and so far as we are aware, none of these methods may be successfully employed to remove substantially all of the theobromine from the cocoa. It appears that all of these investigators have failed to realize that theobromine exists in cocoa powder both as the free compound and in combination as perhaps the glucoside. While the exact nature of the theobromine combination is not known, we do know that the compound is held in such a manner as not to be soluble with the free theobromine. It is, therefore, necessary to free this combined theobromine before it may be removed from the cacao product with the free compound.

We have, therefore, aimed to provide a method whereby both the free and the combined alkaloid may be removed from cacao products in a single process.

Another object of our invention is the provision of a process for removing both the combined and free alkaloid from cacao products by means of a single reagent which acts both to hydrolyze the theobromine-containing compound and dissolve the free theobromine from the residue.

We have also aimed to provide a cacao product containing substantially no theobromine.

A still further object of our invention is the provision of a process whereby a selective solvent is employed to remove the alkaloids without removing substantial portions of the fat-free ingredients such as the carbohydrates, proteins, etc.

The solvent used must be sufficiently unstable at an elevated temperature to yield in combination with water an acid, as, for example, hydrochloric acid, which acid will hydrolyze or split off theobromine from its compound. The solvent must be capable of dissolving substantially all of the theobromine originally free and split off in the process, without harming the residual fat-free cacao ingredients. Among the solvents which may be used and which have the above desirable characteristics are tetrachlorethane and carbon tetrachloride and other chlorinated hydrocarbons. We prefer to use tetrachlorethane partly because it makes the process less expensive.

The process comprises, in a general way, the treatment of cacao products with a mixture preferably of tetrachlorethane and water at an elevated temperature, the separation of the solvent from the residue, the washing of the residue, the drying of the residue, and the pulverizing of the residue.

The cocoa is introduced into a suitable closed cooking vessel having an opening at the top which may be subsequently used for removing the water by distillation. If desired, a closed cooking vessel may be employed having a reflux condenser attached thereto. About 100 parts of cocoa to 100 parts of water and 1500 parts of tetrachlorethane are introduced into the vessel and the batch heated to boiling and maintained just at the boiling point for a period of about one-half hour. When a reflux condenser is employed the temperature may be increased to a point which results in copious boiling. The temperature is then raised sufficiently to distill the water content. By this method about 99% of the water is removed, perhaps an equal volume of tetrachlorethane passing over with the water during distillation. The mixture of cocoa and solvent is then introduced into a filter of conventional design and the solvent separated therefrom. In order to further reduce the theobromine content the filter cake is again introduced into the cooking vessel and about 700 parts of boiling tetrachlorethane added thereto, the mixture is held at the boiling temperature for about five minutes and again filtered. This will serve to reduce the theobromine content of the cocoa to about 0.15%. The residue is then introduced into a rotary extractor in which the last traces of solvent are removed by blowing live steam or air directly into the mass. It will be obvious, of course, that other methods of drying may be employed but it has been found to be particularly advantageous to pass live steam or air through the tumbling mass of solids in order to speedily remove all traces of the solvent. Care must be taken to remove the last traces of tetrachlorethane because of the toxic nature of the compound.

Two examples are given below showing how we have actually performed the process and how others may perform it in accordance with this invention.

Example No. 1.—20 parts of commercial cocoa were extracted with 300 parts of tetrachlorethane and ten parts of water by means of incipient boiling for one-half hour. The mass was filtered and the residue washed with 150 parts of boiling tetrachlorethane. The original theobromine content was 2.70%. The theobromine content after washing was 0.09%.

*Example No. 2.*—20 parts of cocoa were extracted with 300 parts of tetrachlorethane and 15 parts of water at incipient boiling temperature for one-half hour and washed with 200 parts of tetrachlorethane. The original theobromine content was 2.70%. The theobromine content after washing was 0.12%.

Theobromine was determined by the method of Raymond W. Wadsworth as set forth in Analyst 42, 32–7 (1921).

The tetrachlorethane may be recovered from the theobromine and fat which it contains by a simple dry distillation. The theobromine and fat may be recovered, if desired, by steam distilling the residue from the above dry distillation to remove the last traces of tetrachlorethane and separating the components of the residue by means of suitable solvents.

While there is some ambiguity in connection with the process we are convinced that it depends in part upon the action of water upon tetrachlorethane which causes hydrolysis thereof to give a hydrochloric acid solution of low concentration. During the first boiling period the hydrochloric acid acts upon the alkaloid-containing compounds causing hydrolysis thereof and the liberation of the combined alkaloid. Boiling should, therefore, be continued long enough to cause the complete hydrolysis of the alkaloid containing compounds but should not be continued so long as to hydrolyze the starch or otherwise materially affect the cocoa. The amount of water used should be substantially sufficient to saturate the tetrachlorethane, this being 3 to 4 percent, though smaller amounts may be used, and this water may be removed before filtration or not as desired. We have found, however, that if the water is removed by distillation the solvent is less corrosive during the filtration operations and that the normally desirable constituents of the product are less soluble in the solvent. It is important that the filtrations be carried out while the solutions are hot since the theobromine is considerably more soluble in the hot solvent than in the cold. Though we have outlined but a single washing operation it will be evident that these operations may be repeated in order to obtain a product more completely free from the alkaloid.

It will be apparent from the foregoing that we have provided a novel and new method for the removal of the alkaloids from cacao products which is quite simple in its nature. By this method the normally desirable fat content of the cocoa is not removed and the aroma and flavor of the products are substantially retained. The products are, therefore, highly suited to be used as foods.

Generic claims covering the process of this application are contained in copending application, Serial No. 406,983, filed November 13, 1929.

While we have thus described a particular embodiment of our invention we are aware that numerous changes may be made therein without materially departing from the spirit and scope of the invention and we do not wish to be limited except as required by the prior art and the scope of the appended claims.

We claim:

1. The process of treating cacao products which includes adding thereto a reagent consisting of tetrachlorethane containing a small proportion of water, heating the mixture, separating the residue from the tetrachlorethane and water, washing the residue, and drying the residue.

2. The process of treating cacao products which includes adding thereto a reagent consisting of tetrachlorethane and water, heating the mixture, separating the tetrachlorethane and water from the residue, washing the residue with tetrachlorethane, and drying the residue by means of heated inert gases.

3. The process of treating cacao products which includes adding thereto a reagent consisting of tetrachlorethane and water, heating the mixture, separating the tetrachlorethane and water from the residue, and drying the residue by means of heated inert gases.

4. The process of treating cacao products which includes adding thereto a reagent consisting of tetrachlorethane and water, heating the mixture at least to its initial boiling point, filtering the mixture, washing the cake with tetrachlorethane, and drying the cake by means of heated inert gases.

5. The process of treating cacao products which includes adding thereto a reagent consisting of tetrachlorethane and water, heating the mixture, distilling off substantially all of the water from the mixture, filtering the mixture, washing the cake, and drying the cake until substantially free from tetrachlorethane.

6. The process of treating cacao products which includes adding thereto a reagent consisting of tetrachlorethane and water, heating the mixture, distilling off substantially all of the water from the mixture, filtering the mixture, washing the cake, and drying the cake by means of heated inert gases until substantially free from tetrachlorethane.

7. The process of treating cacao products which includes adding thereto a reagent consisting of tetrachlorethane and water, heating the mixture, distilling off substantially all of the water from the mixture, filtering the mixture, and drying the cake by means of heated inert gases until substantially free from tetrachlorethane.

8. The process of treating cacao products which includes adding thereto a reagent consisting of tetrachlorethane and water, heating the mixture, filtering the mixture, treating the cake with heated tetrachlorethane, filtering the mixture thus obtained, and drying the cake by means of heated inert gases until substantially free from tetrachlorethane.

9. The process of treating cacao products which includes adding thereto a reagent consisting of tetrachlorethane and water, heating the mixture at least to its initial boiling point, distilling off substantially all of the water from the mixture, filtering the mixture, treating the cake with heated tetrachlorethane, filtering the mixture thus obtained, and drying the cake by means of heated inert gases until substantially free from tetrachlorethane.

10. The process of treating cacao products to remove the alkaloids therein and prepare a food product which includes the steps of treating said products with a mixture of water and an unstable organic solvent for said alkaloids yielding hydrochloric acid with said water, for hydrolyzing the alkaloid containing compounds and simultaneously dissolving the alkaloids, heating the mixture of reagent and products to bring about the breaking down of said products and the solution of the alkaloids, separating the solvent and dissolved alkaloid from the residue, washing the residue, and drying the residue until the solvent has been substantially removed.

11. The process of treating cacao products to remove the theobromine and prepare a food for human consumption which includes the steps of treating said products with a reagent consisting of water and an organic solvent for theobromine unstable at elevated temperatures to yield hydrochloric acid with said water, for hydrolyzing the theobromine containing compounds and dissolving the theobromine, heating the mixture to bring about the breaking down of said compounds and the solution of the theobromine, distilling the water from the mixture, filtering the solvent and dissolve theobromine from the residue, washing the residue with said solvent until substantially free from theobromine, and drying the residue by means of inert gases until the solvent has been substantially removed.

JOHN HARVEY KELLOGG.
GEORGE L. TELLER.
W. KEDZIE TELLER.